(12) United States Patent
Lien et al.

(10) Patent No.: US 12,236,244 B1
(45) Date of Patent: Feb. 25, 2025

(54) MULTI-DEGREE BRANCH PREDICTOR

(71) Applicant: Apple Inc., Cupertino, CA (US)

(72) Inventors: Wei-Han Lien, Saratoga, CA (US); Muawya M. Al-Otoom, Lake Oswego, OR (US); Ian D. Kountanis, Santa Clara, CA (US); Niket K. Choudhary, San Jose, CA (US); Pruthivi Vuyyuru, San Jose, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/810,253

(22) Filed: Jun. 30, 2022

(51) Int. Cl.
*G06F 9/38* (2018.01)

(52) U.S. Cl.
CPC .......... *G06F 9/3848* (2013.01); *G06F 9/3806* (2013.01); *G06F 9/3842* (2013.01)

(58) Field of Classification Search
CPC .... G06F 9/3005; G06F 9/30058; G06F 9/323; G06F 9/3806; G06F 9/3842; G06F 9/3844; G06F 9/3848; G06F 9/3861
See application file for complete search history.

(56) References Cited

U.S. PATENT DOCUMENTS

| | | | | |
|---|---|---|---|---|
| 6,134,654 | A * | 10/2000 | Patel ...................... | G06F 9/3806 712/240 |
| 6,553,488 | B2 * | 4/2003 | Yeh ........................ | G06F 9/3806 712/240 |
| 6,697,937 | B1 * | 2/2004 | Henry .................... | G06F 9/3848 712/240 |
| 10,223,123 | B1 * | 3/2019 | Blasco ................. | G06F 9/30058 |
| 10,613,867 | B1 * | 4/2020 | Srinivasan ............ | G06F 9/3848 |
| 10,929,136 | B2 * | 2/2021 | Hu ......................... | G06F 9/3867 |
| 11,029,959 | B2 * | 6/2021 | Ishii ...................... | G06F 9/3851 |

(Continued)

OTHER PUBLICATIONS

D. Parikh, K. Skadron, Yan Zhang, M. Barcella and M. R. Stan, "Power issues related to branch prediction," Proceedings Eighth International Symposium on High Performance Computer Architecture, Cambridge, MA, USA, pp. 233-244 (Year: 2002).*

(Continued)

*Primary Examiner* — Courtney P Spann
*Assistant Examiner* — Kasim Alli
(74) *Attorney, Agent, or Firm* — Kowert, Hood, Munyon, Rankin & Goetzel, P.C.; Dean M. Munyon (57) ABSTRACT

A multi-degree branch predictor is disclosed. A processing circuit includes an instruction fetch circuit configured to fetch branch instructions, and a branch prediction circuit having a plurality of prediction subcircuits. The prediction subcircuits are configured to store different amounts of branch history data with respect to other ones, and to receive an indication of a given branch instruction in a particular clock cycle. The prediction subcircuits implement a common branch prediction scheme to output, in different clock cycles, corresponding predictions for the given branch instruction using the different amounts of branch history data and cause, instruction fetches to be performed by the instruction fetch circuit. The prediction subcircuits are also configured to override, in subsequent clock cycles, instruction fetches caused by prediction subcircuits with comparatively less branch history data based on contrary predictions performed in subsequent clock cycles by prediction subcircuits with more branch history data.

20 Claims, 6 Drawing Sheets

(56) References Cited

U.S. PATENT DOCUMENTS

| | | | |
|---|---|---|---|
| 2005/0149707 A1* | 7/2005 | Jourdan | G06F 9/3848 |
| | | | 712/239 |
| 2006/0015547 A1 | 1/2006 | Kuszmaul et al. | |
| 2015/0121050 A1* | 4/2015 | Williams | G06F 9/30058 |
| | | | 712/238 |
| 2017/0068539 A1* | 3/2017 | Dundas | G06F 9/3806 |
| 2020/0210197 A1 | 7/2020 | Asanovic et al. | |
| 2021/0255859 A1 | 8/2021 | Asanovic et al. | |
| 2022/0121446 A1* | 4/2022 | McDonald | G06F 9/3806 |
| 2023/0118268 A1* | 4/2023 | Bolbenes | G06F 9/3802 |
| | | | 712/239 |

OTHER PUBLICATIONS

Andre Seznec, "A 256 Kbits L-TAGE branch predictor," Journal of Instruction-Level Parallelism (JILP) Special Issue: The Second Championship Branch Prediction Competition (CBP-2), vol. 9; Publication date May 2007; 6 pages.

Zhao et al., "SonicBOOM: The 3rd Generation Berkeley Out-of-Order Machine," UC Berkeley; https://carrv.github.io/2020/papers/CARRV2020_paper_15_Zhao.pdf; 7 pages. [Retrieved Sep. 31, 2021].

* cited by examiner

MULTI-DEGREE BRANCH PREDICTOR

BACKGROUND

Technical Field

This disclosure is directed to processors, and more particularly, to branch predictors used to predict the direction of branch instructions.

Description of the Related Art

Modern processors use pipelining to maximize processing throughput. Pipelining is a form of instruction level parallelism in which multiple instructions may be at different stages of execution at a given time. The stages of execution include instruction fetch, decode, operand fetch, execution, and writeback (to registers). Ideally, pipelining seeks to ensure that each of the pipeline stages is operating on an instruction at all times. Various techniques may be performed to support this goal.

Two such techniques used in pipelining are branch prediction and speculative execution. Branch prediction is used to predict the direction of a branch instruction that can alter the code sequence depending on whether or not the branch is taken. Speculative execution may be used to execute instructions following the branch, based on a branch prediction, prior to determination of its actual direction. Speculatively executing instructions based on a branch prediction may eliminate the wait time to determine the actual direction of the branch, and can thus keep the pipeline full when the prediction is correct. The results of the speculatively executed instructions can be temporarily stored in physical registers, and eventually committed to architected registers in the indicated program order. Since the delay of waiting on a determination of the actual branch direction is eliminated, processor throughput is increased using these techniques.

SUMMARY

A multi-degree branch predictor is disclosed. In one embodiment, a processing circuit includes an instruction fetch circuit configured to fetch instructions, including branch instructions, for execution. The processing circuit further includes a branch prediction circuit having a plurality of prediction subcircuits. The plurality of prediction subcircuits are configured to store different amounts of branch history data with respect to other ones of the prediction subcircuits and further configured to receive an indication of a given branch instruction in a particular clock cycle of the processing circuit. The plurality of prediction subcircuits implement a common branch prediction scheme to output, in different clock cycles, different predictions for the given branch instruction using the different amounts of branch history data and furthermore cause, based on the different predictions, instruction fetches to be performed by the instruction fetch circuit. Ones of the plurality of prediction subcircuits are also configured to override, in subsequent clock cycles, instruction fetches caused by prediction subcircuits with comparatively less branch history data based on contrary predictions performed in previous clock cycles of prediction subcircuits with comparatively more branch history data.

In various embodiments, the prediction subcircuits include history tables that store branch prediction history. The size of the history table (and thus amount of history stored therein) is different for a given prediction subcircuit with respect to other ones of the prediction subcircuits. The prediction subcircuits are arranged in degrees, with higher degrees having larger history tables. The smaller degrees generate branch predictions earlier than the larger degrees. For example, a first prediction subcircuit (first degree) may generate a prediction during a first clock cycle, while a second prediction subcircuit (second degree) may generate a prediction during a second clock cycle subsequent to the first clock cycle. The branch prediction circuit may also include a base predictor (e.g., implemented as a saturating counter) that generates a preliminary prediction prior to the first prediction subcircuit.

BRIEF DESCRIPTION OF THE DRAWINGS

The following detailed description makes reference to the accompanying drawings, which are now briefly described.

DETAILED DESCRIPTION OF EMBODIMENTS

The present disclosure is directed to a multi-degree branch predictor. Branch prediction is used in modern processors to predict the direction of branches and to thus allow speculative execution of instructions following the branch. Correct branch prediction can provide performance gains, while incorrectly predicted branches can negatively impact performance. Accordingly, correct branch prediction is important to maintain high performance in processors that execute branch instructions.

Some types of branch prediction circuits use history tables in making predictions, with larger history tables storing more branch prediction history that may lead to more accurate predictions and less aliasing of different branches to the same entry in the table. However, as history tables become larger, they are more difficult to manage, e.g., in terms of timing, particularly if trying to increase the processor clock speed. Thus, the size of history tables used in branch predictors may be limited by clock speed and timing issues, necessitating the use of smaller history tables. However, smaller history tables can have a negative performance impact due to a larger number of inaccurate predictions.

The present disclosure makes use of the insight that smaller history tables can be used to quickly generate branch predictions, while larger history tables can be used to refine these predictions. Accordingly, the present disclosure is directed to a branch prediction unit, or circuit, in which a number of branch history tables are used and are divided into groups (which may be referred to as degrees). The smaller history tables, which are indexed with a smaller amount of branch history, are in the early degrees of the branch prediction circuit, which generate a fast prediction. The degrees with larger history tables are slower to generate predictions, but using a greater amount of history, are more accurate. The later degrees, using a larger amount of branch history, may override the predictions of the earlier degrees when there is a disagreement there between.

In one embodiment, a first degree of a branch prediction circuit as disclosed herein generates a first prediction during a first clock cycle, while a second degree generates a second prediction during a second clock cycle subsequent to the first. The second degree may use a larger amount of branch history than the first degree, and may thus generate a more accurate prediction. If the second branch prediction disagrees with the first, the second degree can override the prediction generated by the first degree. The overriding of the first prediction can include the second degree causing an instruction fetch circuit to redirect the fetching of instructions that follow the branch. If instructions have already been fetched, the overriding of the first prediction can include a flushing of the previous fetch. A redirect is defined herein as a change of a fetch of instructions following one direction of the branch to a fetch of instructions following the other direction of the branch. A redirect may include a flush of instructions that have already been fetched, although it is possible for redirects to occur before a fetch has completed.

Accordingly, the branch prediction circuit as disclosed herein may provide a balance between the speed and accuracy at which branch predictions are provided. Generating predictions with early degrees may improve performance by providing predictions in a shorter amount of time. Generating predictions with the later degrees, using a larger amount of branch history, may thus provide for more accuracy. When there is agreement between the various degrees of the branch prediction circuit, both speed and accuracy are provided in the prediction process.

Figure 1:
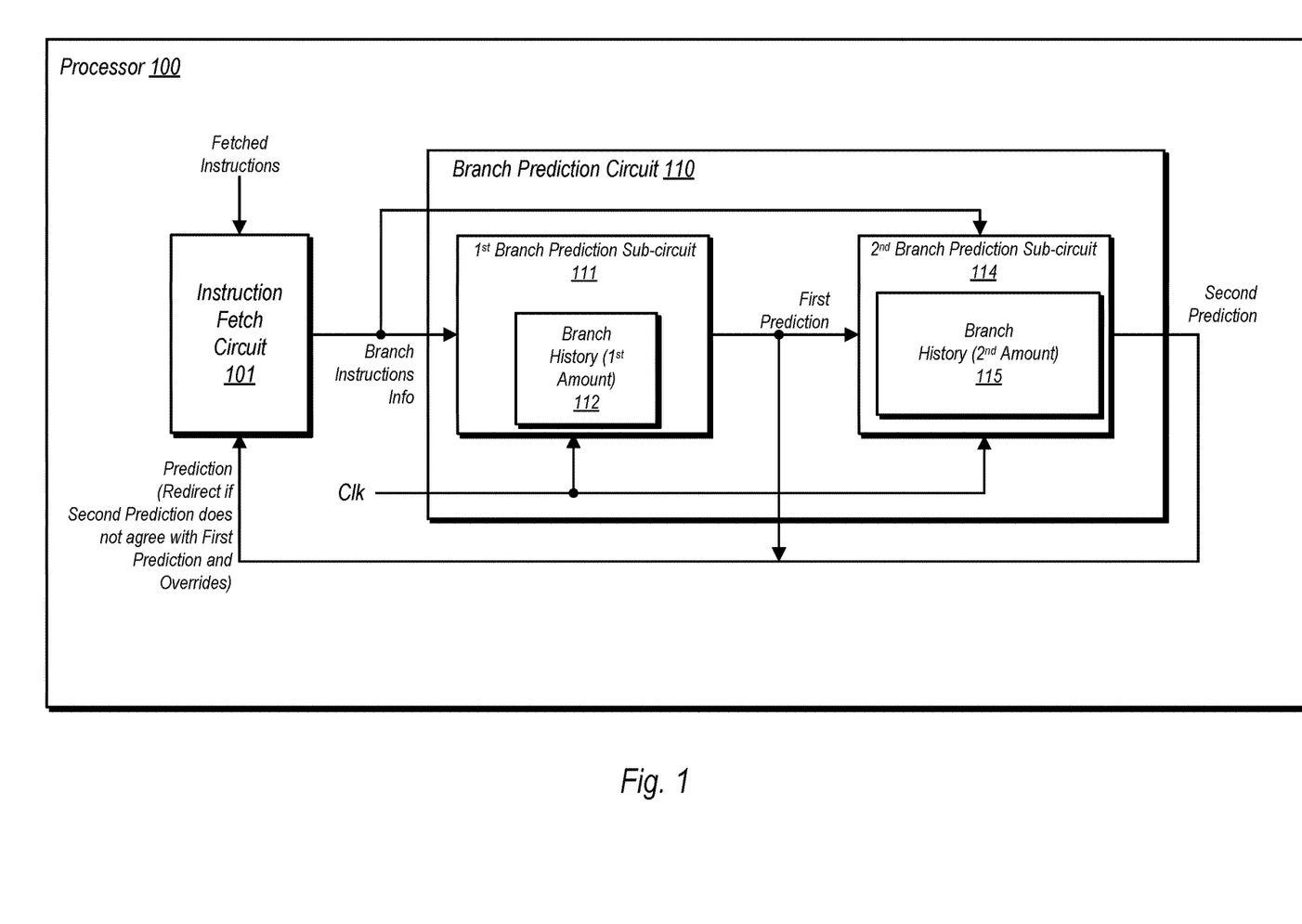
FIG. 1 is a block diagram of one embodiment of a branch prediction circuit coupled to an instruction fetch circuit.
Figure 2:
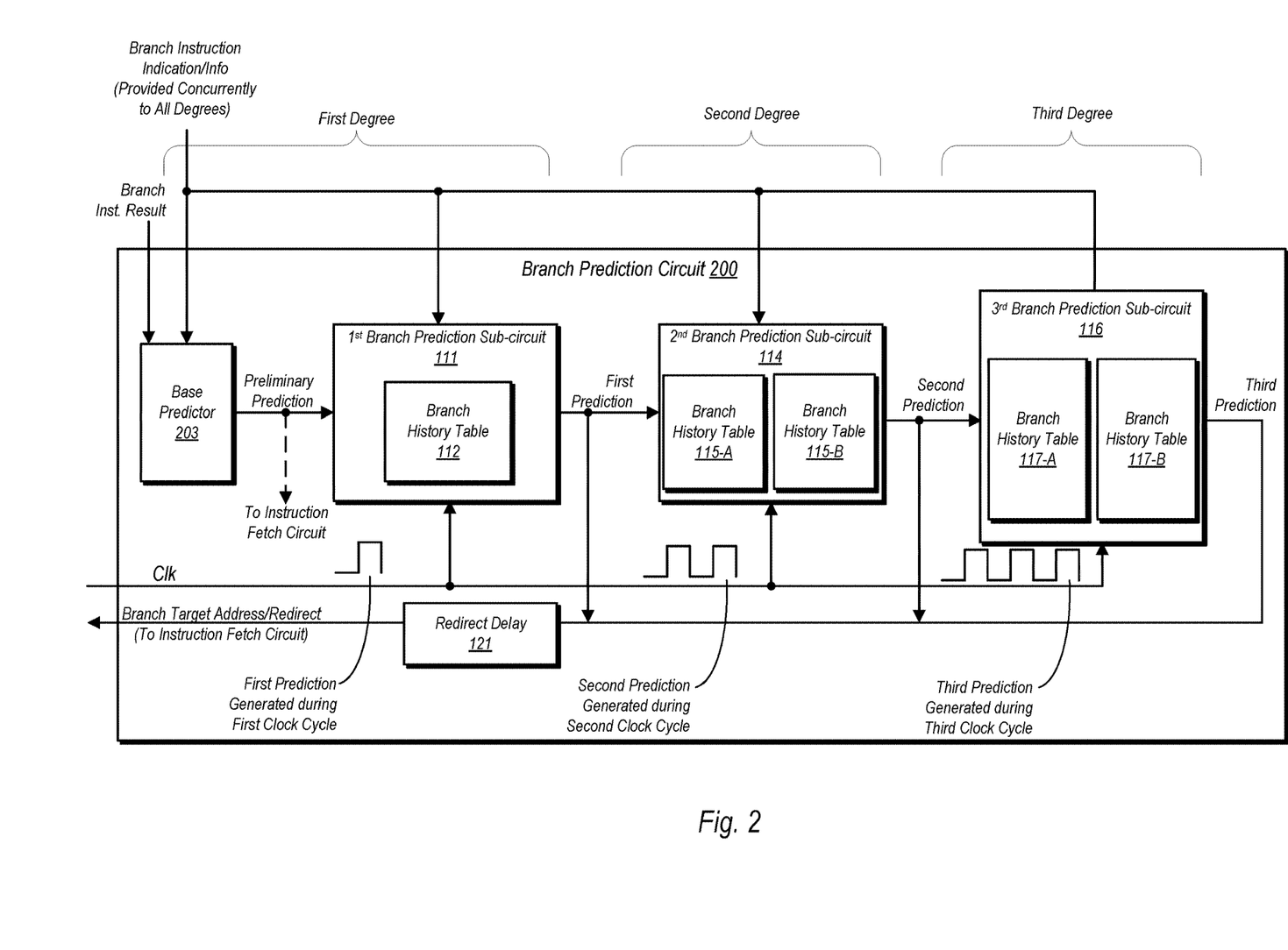
FIG. 2 is a block diagram of another embodiment of a branch prediction circuit.

Various embodiments of a branch prediction circuits and its operation, in accordance with the disclosure, are now discussed in further detail. The discussion begins with various embodiments of a branch prediction circuit, as illustrated in FIGS. 1 and 2. Thereafter, one embodiment of a processor including a branch prediction circuit is discussed. Various methods for operating a branch prediction circuitry are then described, followed by a discussion of an example system.

Branch Prediction Circuit Embodiments

Turning now to FIG. 1, a block diagram of one embodiment of a processor including a branch prediction circuit is shown. In the embodiment shown, processor 100 is a processing circuit that executes instructions in one or more execution units (not shown here). Processor 100 may include other components as well, including register files, various functional circuits of a processing pipeline (e.g., a scheduler) and so on. In various embodiments, processor 100 may be a processor core implemented on a system-on-a-chip (SoC), which may include a number of processor cores.

Processor 110 includes an instruction fetch circuit 101 (sometimes referred to as an instruction fetch circuit) and a branch prediction circuit 110. Instruction fetch circuit 101 is configured to fetch instructions to be executed by programs or threads running on processor 100. The instructions may be fetched from various locations in a memory hierarchy, such as a level one instruction cache, a lower level cache, or main memory. Instruction fetch circuit 101 in this embodiment is configured to support various pipelining techniques such as out-of-order execution and speculative execution. Instruction fetch circuit 101 may thus fetch instructions in accordance with these techniques rather than being restricted to fetching instructions in a strict program order. Since the fetched instructions may include branch instructions, instruction fetch circuit 101 may utilize predictions generated by branch prediction circuit 110 to perform fetches of instructions that are to be speculatively executed (e.g., executed based on a predicted direction of a branch prior to confirmation that the prediction is correct).

Branch prediction circuit 110 in the embodiment shown is configured to generate predictions of a direction to be taken by a branch instruction (e.g., branch taken or not taken). Using a prediction received from branch prediction circuit 110, instruction fetch circuit 101 may fetch one or more instructions following the branch instruction in accordance with the predicted direction of the branch. These instructions may then be speculatively executed, with their results stored in a register file that, for example, utilizes the technique of register renaming. If the prediction generated by branch prediction circuit 110 proves to be correct, the stored results from the speculatively executed instructions may be committed to architected registers of processor 100 in the correct program order. By employing the techniques of branch prediction and speculative execution, processor throughput can be increased when the branch predictions are correct. This in turn can result in an overall performance increase by processor 100.

In the event that a prediction is not correct, any results from speculatively executed instructions are flushed from the register file in which they are stored. Furthermore, instruction fetch circuit 101 responds to the incorrect branch prediction by fetching instructions for the correct direction of the branch. The speculative execution of instructions as a result of an incorrectly predicted branch, the storage and subsequent discarding of their results, and the additional fetching of instructions corresponding to the correct direction of the branch all result in a negative impact on processor performance, as a number of processing cycles are wasted. Accordingly, correct branch prediction is important for obtaining the performance benefit of speculatively executing instructions following the branch.

Branch prediction circuit 110 in the embodiment shown is configured to generate multiple branch predictions in ones of a number of different prediction subcircuits. In this particular embodiment, branch prediction circuit 110 includes a first branch prediction subcircuit 111 and a second branch prediction subcircuit 114. However, the number of branch prediction subcircuits is not limited to the two shown here, and thus the disclosure contemplates any suitable number of branch prediction subcircuits. The various prediction subcircuits may be referred to as degrees, as will be discussed below in reference to FIG. 2.

The first branch prediction subcircuit 111 includes storage for branch history 112 of a first amount. Similarly, the second branch prediction subcircuit 114 includes storage for branch history 115 of a second amount that is different from the first amount. In both of prediction subcircuits 111 and 114, the respective branch histories may be stored in one or more corresponding branch history tables. The branch history stores information indicative of previous branch instructions and the direction taken thereby, and may also store information on corresponding predictions (e.g., whether the prediction was correct or not). The second amount of branch history 115 in this embodiment is greater than the first amount of branch history 112. More generally, each successive branch prediction subcircuit in a given embodiment may store more branch history than its predecessor. Thus, for example, in an embodiment having three branch prediction subcircuits, the third branch prediction subcircuit includes storage for a greater amount of history than the second branch prediction subcircuit, which in turn includes storage for a greater amount of history than the first branch prediction subcircuit. The branch history in each of the prediction subcircuits may be accessed when generating a corresponding branch prediction. Predictions generated based on a greater amount of branch history may be more accurate than those generated from less history. Accordingly, a prediction generated by second branch prediction subcircuit 114 will usually be more accurate than one generated by first branch prediction subcircuit 111.

Each of the branch prediction subcircuits is arranged to receive an indication of a given branch instruction during a particular clock cycle of processor 100 (e.g., the indication is received in parallel by the prediction subcircuits). The indication of the branch instruction may include information such as a program counter value, a tag value, and so on. The prediction subcircuits 111 and 114 in the embodiment shown are configured to generate a prediction using a common branch prediction scheme. Any suitable branch prediction scheme that utilizes history of previously executed branch instructions may be used. For example, the present disclosure contemplates TAGE (tagged geometric) branch prediction, neural branch prediction, and other types of branch prediction schemes that utilize branch history as a basis for the generated predictions.

The different branch prediction subcircuits 111 and 114 in the embodiment shown generate respective predictions in different cycles of the received clock signal, Clk. For example, the first branch prediction subcircuit 111 may generate the first prediction during a first clock cycle subsequent to receiving the branch instruction information, while the second branch prediction subcircuit generates the second prediction during a second clock cycle that is subsequent to the first. In embodiments with three or more branch prediction subcircuits, successive predictions may be generated by the prediction subcircuits in successive clock cycles. This is due at least in part to the larger amount of branch history to be accessed in successive ones of the branch prediction subcircuits, as history table access time increases with the amount of branch history stored therein.

The generation of predictions by the prediction subcircuits 111 and 114 may be used to cause instruction fetches to be carried out by instruction fetch circuit 101. For example, in response to receiving the first prediction from first prediction subcircuit 111, instruction fetch circuit 101 may begin a fetch those instructions that follow the branch instruction in accordance with the predicted direction thereof. If the second prediction is in agreement with the first prediction, the need for an additional fetch of these instructions is obviated. However, it is possible that the first prediction and second prediction do not agree. Thus, in the embodiment shown, disagreement between the first prediction and second prediction causes a redirect. The redirect overrides any fetches that have begun in accordance with the first prediction, causing the instruction fetch circuit 101 to fetch instructions following the branch in accordance with the second prediction. Additionally, instructions that have been fetched by instruction fetch circuit 101 in accordance with the first prediction may be flushed or discarded.

FIG. 2 is a block diagram of another embodiment of a branch prediction circuit. In the embodiment shown, branch prediction circuit 200 is divided into three different degrees, a first degree, a second degree, and a third degree. The first degree of branch prediction circuit 200 includes base predictor 203 and first prediction subcircuit 111. The second degree includes a second branch prediction subcircuit 114, while the third degree includes a third branch prediction subcircuit 116. The degrees of branch prediction circuit 200 are arranged to concurrently receive an indication that a branch instruction has been fetched, along with information regarding the branch instruction. Using this indication/information, the various degrees of branch prediction circuit 200 may begin operations to generate corresponding branch predictions, which are provided during different cycles of the clock signal, Clk.

The first degree of branch prediction circuit 200 in the embodiment shown is configured to generate both a preliminary prediction and a first prediction during a first clock cycle. The preliminary prediction is generated by base predictor 203, which is a relatively simple branch prediction circuit. In one embodiment, base predictor 203 is a saturating counter with four different states: strongly not taken, weakly not taken, weakly taken, and strongly taken. A present prediction by base predictor 203 is based on a current state of the base counter in such embodiments. If the saturating counter is in either of the weakly taken or strongly taken states, the current prediction is that the branch is taken. If the saturating counter is in one of the not taken states (strongly or weakly), the current prediction is that the branch is not taken. Depending on the present prediction and the results thereof, the saturating counter may cycle to another state or remain in its present state. For example, if the base predictor 203 is presently in the weakly taken state (thus generating a taken prediction) and the branch is ultimately taken, the next state of the base predictor 203 is the strongly taken state. However, if the branch is ultimately not taken, base predictor 203 transitions to the weakly not taken state. When in one of the strong states (e.g., strongly taken, strongly not taken), base predictor 203 may remain in that state if its prediction is correct. For example, when in the strongly taken state (thus resulting in a prediction of branch taken), a correct prediction results in base predictor 203 remaining in that state. When in one of the weak states (weakly taken, weakly not taken), base predictor 203 transitions to the corresponding strong state when the prediction is correct, but transitions to the opposite weak state when the prediction is not correct.

While a saturating counter has been provided as an example of one embodiment of base predictor 203, the disclosure is not limited to this type. Any suitable branch predictor may be used to implement base predictor 203.

In some embodiments, the preliminary prediction generated by base predictor 203 may be provided to an instruction fetch circuit (not shown in this drawing), which may begin fetching instructions following the branch based thereon. However, embodiments are possible and contemplated in which the fetching of instructions is delayed until one or more of the prediction subcircuits 111, 114, and 116 has generated a prediction.

First branch prediction subcircuit 111 is configured to generate a first prediction during the first clock cycle. The first prediction is generated using history stored in branch history table 112, which stores the smallest amount of history among the history tables in the prediction subcircuits of branch prediction circuit 200. Because the table is smaller (and thus there is less history to access), first prediction subcircuit 111 may generate a prediction faster than the other prediction subcircuits. However, using a smaller amount of branch history may result in less accurate predictions over time.

The first prediction in this particular embodiment is provided to a re-direct delay circuit 121. The redirect delay circuit 121 may delay redirects that are generated by disagreements among the various prediction subcircuits in branch prediction circuit 200. For example, if the first prediction does not agree with the preliminary prediction, redirect delay circuit 121 may delay a redirect resulting from the disagreement until the second prediction is received. If the second prediction (based on a greater amount of branch history) disagrees with the first prediction (thus agreeing with the preliminary prediction), a redirect that would be caused by the prior disagreement could then be canceled. This may avoid the cancellation of at least some fetches that are in progress, and may additionally avoid a flush of some fetched instructions from an instruction fetch circuit that were fetched based on a prediction that has been overridden.

It is noted that in some embodiments, the redirect delay circuit 121 may be configurable with regard to the point at which redirects are delayed and at which the various predictions are provided to the instruction fetch circuit to allow commencement of fetching instructions that follow the predicted branch instruction. Embodiments are further contemplated in which redirect delay circuit 121 conditionally allows predictions to be provided to the instruction fetch circuit at various points in the prediction cycle. For example, an embodiment is contemplated in which redirect delay circuit 121 may allow the first prediction to be provided to the instruction fetch circuit when it is in agreement with the preliminary prediction, but delays redirecting until generation of the second prediction when the first prediction is not in agreement with the preliminary prediction. If the second prediction agrees with the preliminary prediction, the redirect is then canceled. Otherwise, when both the first and second predictions disagree with the preliminary prediction, the redirect may be carried out. Furthermore, embodiments are contemplated wherein the delay points are dynamically changed during operation. One possible embodiment contemplates determining the delay point on a per-instruction basis. Generally speaking, the operation of redirect delay circuit 121 may be highly and dynamically configurable in various embodiments.

Second branch prediction subcircuit 114 in the embodiment shown generates a second prediction based on the history stored in branch history tables 115-A and 115-B. The amount of branch history stored in branch history tables 115-A and 115-B is greater than that stored in branch history table 112 of the first branch prediction subcircuit 111. Accordingly, the predictions generated by second branch prediction subcircuit 114 tend to be more accurate over time than those generated by first branch prediction subcircuit 111. The second prediction is generated by the second branch prediction subcircuit 114 during a second clock cycle that is subsequent to the first clock cycle. This second prediction is provided to redirect delay circuit 121 in the embodiment shown, but may be forwarded to the instruction fetch circuit to enable it to begin fetching instructions based on the predicted direction of the branch instruction for which the prediction was generated.

When there is disagreement between the second prediction and the first prediction, the former overrides the latter. If a redirect is pending (due to disagreement between the first prediction and the preliminary prediction), the second prediction causes a cancellation of the redirect. On the other hand, if both the preliminary and first predictions are in agreement, but the second prediction is not in agreement with either, a redirect is generated. Furthermore, if a redirect is pending due to disagreement between the preliminary prediction and the first prediction while the latter is in agreement with the second prediction, the redirect either remains pending or is carried out by signaling the instruction fetch circuit to fetch instructions in accordance with the second prediction.

The third branch prediction subcircuit 116 in the embodiment shown generates a third prediction during a third clock cycle that is subsequent to the first and second clock cycles. The third branch prediction is generated based on the branch history stored in branch tables 117-A and 117-B, which is greater than the amount of branch history stored in the tables of the other prediction subcircuits shown here. Accordingly, the third prediction has a greater likelihood of being correct than the preliminary, first, and second predictions. Thus, even if the preliminary, first, and second predictions are in agreement, disagreement by the third prediction causes a redirect in the embodiment shown. The third prediction can also cause cancellation of a redirect when one is pending as a result of the second prediction.

Generally speaking, a prediction generated by the branch prediction circuit 200 in various embodiments is the final prediction result generated by a branch prediction circuit in accordance with this disclosure. This may increase the accuracy of branch predictions over time. However, since earlier predictions can be the basis for beginning of an instruction fetch by the instruction fetch circuit, instruction fetches can commence at an earlier time (e.g., based on the first or second predictions) with the final prediction providing confirmation when in agreement. Accordingly, branch prediction circuit 200 may provide a balance between accurate predictions and performance.

Figure 3:
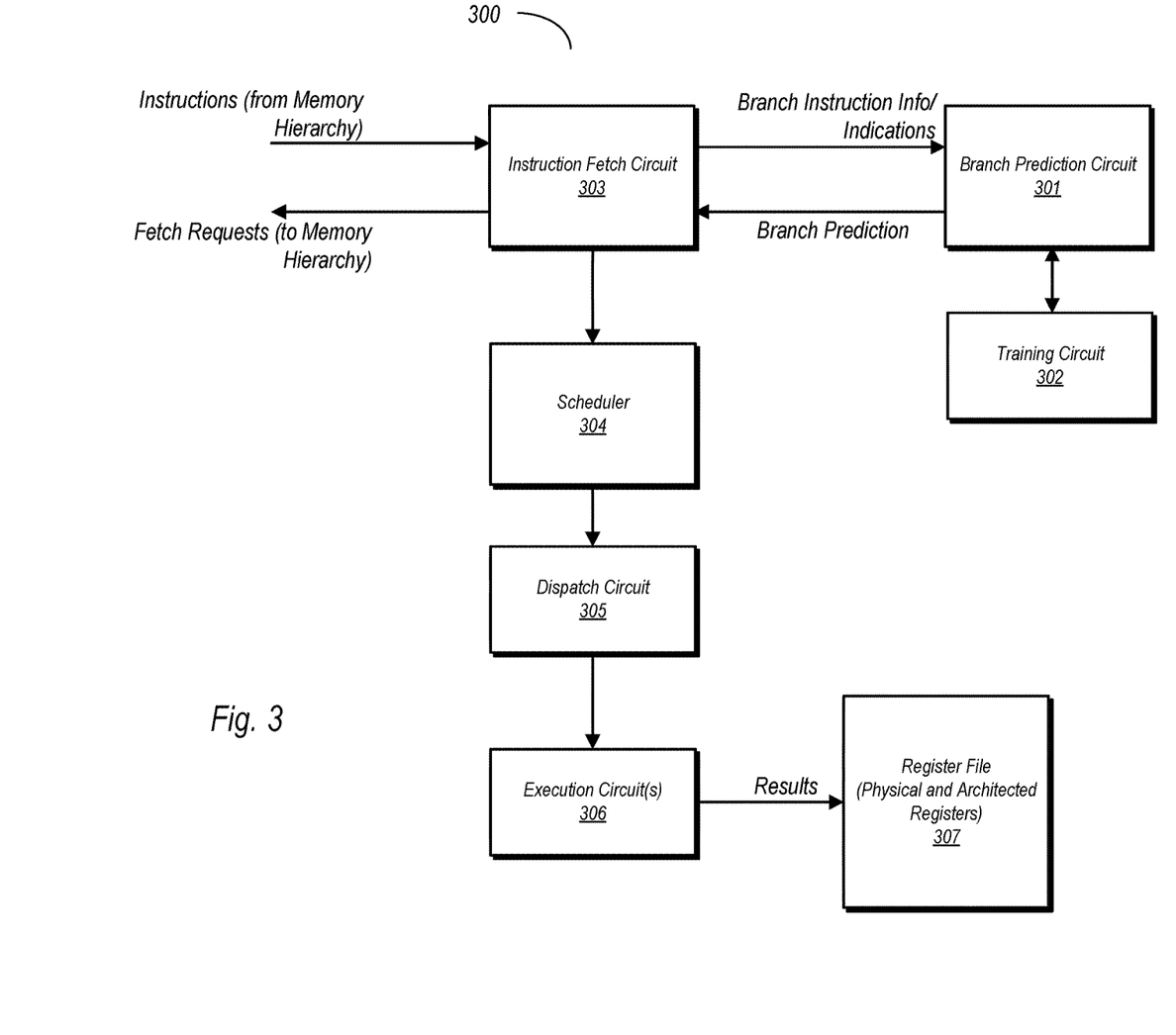
FIG. 3 is a block diagram of one embodiment of a processor having a branch prediction circuit.

Processor with Branch Prediction Circuit:

FIG. 3 is a block diagram of one embodiment of a processor illustrating the relationship of a branch prediction circuit to various other circuits in an execution pipeline. In the embodiment shown, processor 300 includes an instruction fetch circuit 303, a scheduler 304, a dispatch circuit 305, and execution circuit(s) 306. A register file 307 is coupled to receive results from execution circuit(s) 306, and may utilize register renaming techniques. Results may be stored in various physical registers of register file 307 and may be committed to architected registers at the appropriate time in accordance with, e.g., a program order.

Instruction fetch circuit 303 is configured to fetch instructions from various locations within a memory hierarchy, based fetch requests sent thereto. Instructions may be fetches from a level one (L1) instruction cache, a lower level (e.g., level 2, or L2) cache, or system memory. The fetched instructions for a given program or thread may include branch instructions.

Branch prediction circuit 301 in the embodiment shown is configured to predict the direction that will be taken by the fetched branch instructions, and may be implemented as any embodiment of the various branch prediction circuits discussed above.

Training circuit 302 in the embodiment shown is configured to perform training routines on branch prediction circuit 301. To train the various branch prediction subcircuits of branch prediction circuit 301, training circuit 302 may provide branch instructions thereto to be predicted, and then check the predictions against a known correct value. In one embodiment, the various branch history tables in the predictions subcircuits may be populated with data such that their respective prediction accuracies are increased to a level deemed satisfactory. The training may be conducted in accordance with a branch prediction scheme that is common to all of the branch prediction subcircuits. Training routines may be performed at various times during the operation of processor 300. For example, training may be performed during a system start-up, periodically, or at times when the accuracy of predictions provided by branch prediction circuit 301 fall below a desired level.

Scheduler 304 in the embodiment shown is configured to schedule instructions for execution. This may include scheduling instructions to be speculatively executed based on a predicted direction of a branch instruction. Scheduler 304 may also perform actions such as dependency and perform out-of-order scheduling of some instructions when doing so prevents bubbles in the execution pipeline. Dependency checking may also be performed to schedule instructions once a dependency has been or will be satisfied due to another instruction scheduled for execution.

Dispatch circuit 305 in the embodiment shown dispatches instructions for execution in accordance with the scheduled order provided by scheduler 304. The execution circuits(s) 306 may then carry out execution of the instructions. The execution circuits(s) may 306 may be of various types, including integer units (for execution of instructions that produce integer data), fixed point units (for execution of instruction that produce fixed point data) and floating point units (for execution of instructions that produce floating point data). As described above, results of executed instructions may be provided to register file 307 to be stored in physical registers therein, and then eventually committed to architected registers. It is noted however, that results from speculatively executed instructions corresponding to a mispredicted branch instruction may be flushed from the physical registers, and are thus not committed to architected registers.

Figure 4:
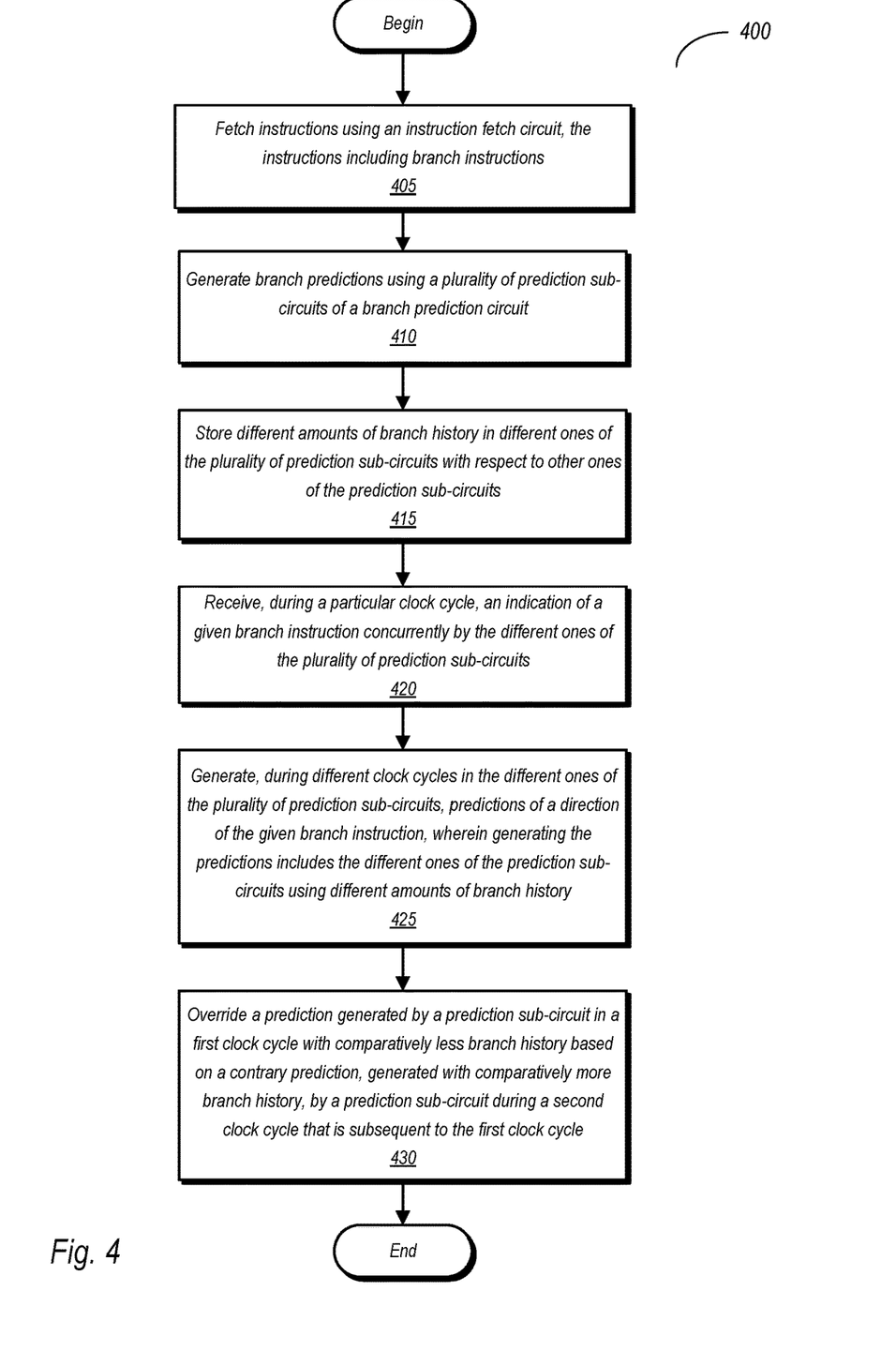
FIG. 4 is a flow diagram illustrating one embodiment of a method for operating a branch prediction circuit.

Methods of Operation:

FIG. 4 is a flow diagram of one embodiment of a method for operating a branch prediction circuit. Method 400 as discussed herein may be performed by any embodiment of a branch prediction circuit as discussed above. Embodiments of a branch prediction circuit capable of carrying out Method 400 but not otherwise discussed herein is also considered to fall within the scope of this disclosure.

Method 400 includes fetching instructions using an instruction fetch circuit, the instructions including branch instructions (block 405) and generating branch predictions by a plurality of prediction subcircuits of a branch prediction circuit using a common prediction scheme (block 410). Operating the plurality of branch prediction subcircuits includes storing different amounts of branch history in different ones of the plurality of prediction subcircuits with respect to other ones of the prediction subcircuits (block 415). The operation further includes receiving, during a particular clock cycle, an indication of a given branch instruction concurrently by the different ones of the plurality of prediction subcircuits (block 420). Method 400 further includes generating, during different clock cycles in the different ones of the plurality of prediction subcircuits, predictions of a direction of the given branch instruction, wherein generating the predictions includes the different ones of the prediction subcircuits using different amounts of branch history (block 425). At times, the predictions generated by the various ones of the plurality of prediction subcircuits may disagree with one another. Accordingly, Method 400 includes overriding a prediction generated by a prediction subcircuit in a first clock cycle with comparatively less branch history based on a contrary prediction, generated with comparatively more branch history, by a prediction subcircuit during a second clock cycle that is subsequent to the first clock cycle (block 430).

In various embodiments, the method includes generating a preliminary prediction using a base prediction circuit and generating, subsequent to generating the preliminary prediction using a first one of the plurality or prediction subcircuits, a first prediction. Embodiments of the method further include fetching, using an instruction fetch circuit, an instruction in accordance with the preliminary prediction. In some embodiments, multiple instructions may be fetched, where the instructions follow the branch instruction in accordance with the predicted direction of the branch. These instructions may be speculatively executed, with their results subsequently committed to architected registers if the prediction of the branch proves correct. However, various embodiments of the method include redirecting the fetching of the instruction, using the first one of the plurality of prediction subcircuits, in response to determining that the first prediction does not agree with the preliminary prediction.

The method may further include delaying redirecting the fetching of the instruction by the first one of the plurality of prediction subcircuits until a second one of the plurality of prediction subcircuits has generated a second prediction subsequent to the generating of the first prediction. Since the second prediction is made using more branch history than the first prediction, it is more likely to be correct. Thus, since the second prediction is more likely to be correct than the first prediction and agrees with the preliminary prediction, the method may further include canceling redirecting the fetching of the instruction by the first one of the plurality of prediction subcircuits in response to a second one of the prediction circuits generating, subsequent to generation of the first prediction, a second prediction that is in agreement with the preliminary prediction.

In instances when redirecting does occur, the method includes flushing results of a fetch made in accordance with a prediction one of the plurality of prediction subcircuits in response to another one of the plurality of prediction subcircuits overriding the prediction of the one of the plurality of prediction subcircuits. The flushing may result in discarding of instructions fetched for one possible direction of the branch. Thereafter, instructions for the other possible direction of the branch may be fetched.

In various embodiments, the method includes operating a training circuit. The training circuit performs training of the plurality of prediction subcircuits in accordance with a common branch prediction scheme. During the training, each of the plurality of training circuits may be trained concurrently by the training circuit until a desired level of prediction accuracy is obtained.

Figure 5:
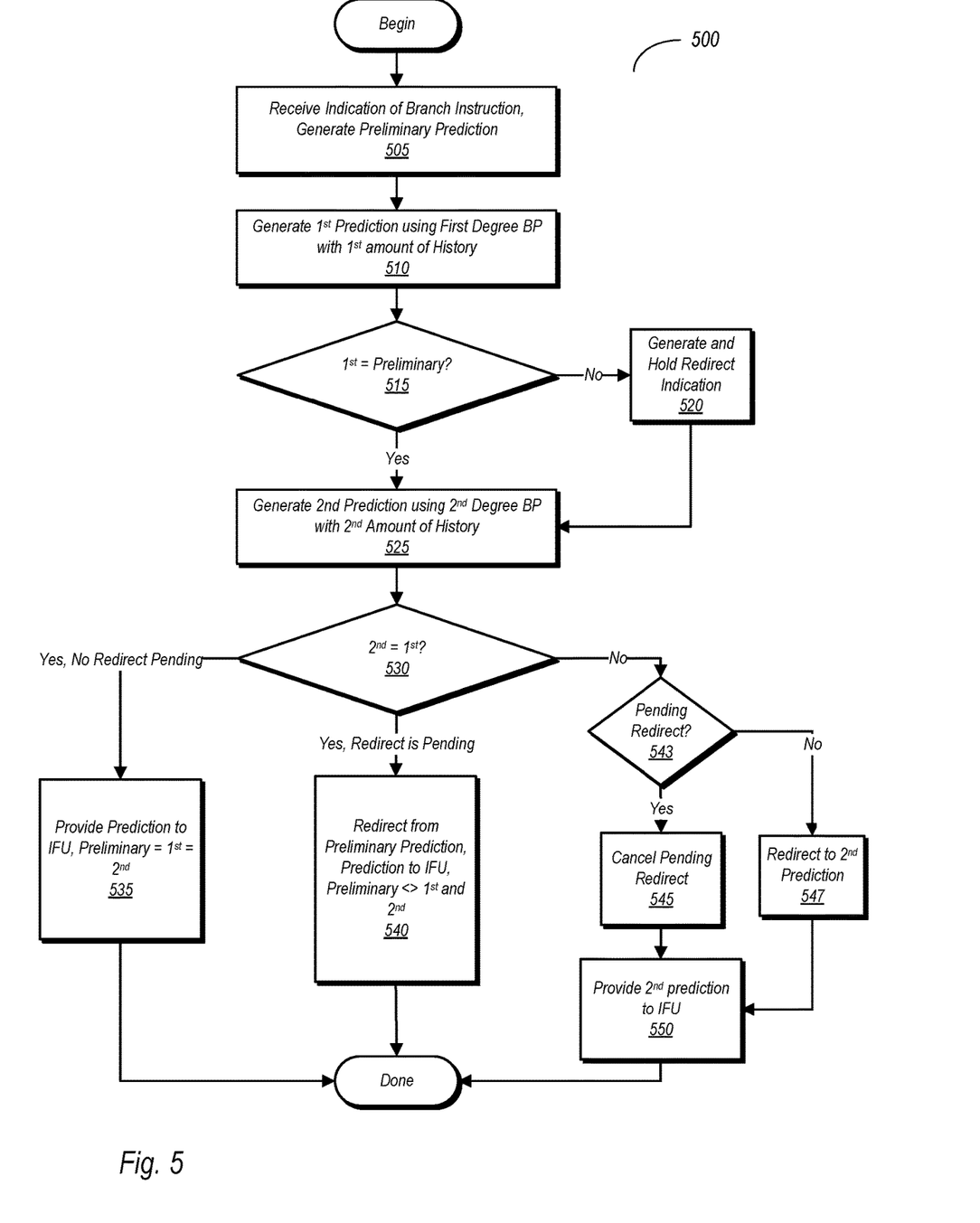
FIG. 5 is a flow diagram illustrating another embodiment of a method for operating a branch prediction circuit.

FIG. 5 is a block diagram of another embodiment of a method for operating a branch prediction circuit. Method 500 in the embodiment shown may be carried out by various ones of the branch prediction circuits discussed above. Furthermore, embodiments of a branch prediction circuit capable of carrying out Method 500, but not otherwise discussed herein, are considered to fall within the scope of this disclosure.

The example operation of Method 500 is applied to a branch prediction circuit having two degrees (and thus two prediction subcircuits). However, it will be apparent to one of skill in the art that Method 500 may be extended to three or more degrees (with a corresponding number of prediction subcircuits). Accordingly, the example of Method 500 discussed here is not intended to limit the disclosure to a particular number of degrees, but is instead provided for illustrative purposes.

Method 500 includes a branch prediction unit receiving an indication of a branch instruction and generating a preliminary prediction (block 505). The indication of the branch instruction may be received from an instruction fetch circuit. The indication may include information such as a program counter value, a tag, and any other pertinent information. The preliminary prediction may be generated by a base predictor.

In one embodiment, the base predictor may be implemented using a saturating counter that has four different possible states: strongly not taken, weakly not taken, weakly taken, and strongly taken. The base predictor generates the prediction based on which state it is currently in at the time the branch prediction circuit receives the indication of the branch instruction. After generating the prediction, the state may be updated or may be maintained depending on the actual result of the branch. For example, if the base predictor is in the weakly taken state when an indication of a branch instruction is received, the generated prediction is of a branch taken. If the prediction proves to be correct, then the saturating counter is updated to change the state to strongly taken. If the prediction is not correct, the saturating counter is updated to the weakly not taken state. In another example, if the saturating counter is in the strongly taken state when an indication of a branch instruction is received, the generated prediction is that the branch will be taken. If the prediction proves correct, the saturating counter remains in the strongly taken state. However, if the prediction proves to be incorrect, the saturating counter state is updated to the weakly taken state.

Generally speaking, the state of the saturating counter will update any time it generates a prediction from the weakly taken or weakly not taken states, with the direction of the update dependent on whether the prediction was correct. When in one of the strongly taken or strongly not taken states, the state remains the same if the prediction is correct, and changes if the prediction is not correct.

In addition to generating the base prediction, a first degree of the branch prediction circuit (comprising a first prediction subcircuit) generates a first branch prediction based on a first amount of history (block 510). The first amount of history may be stored in one or more branch history tables of the first prediction subcircuit. Furthermore, both the preliminary prediction and first prediction may be generated during a first clock cycle.

After generating the first prediction, the direction of operation of Method 500 depends on whether the first prediction agrees with the preliminary prediction. If the first prediction does not agree with the preliminary prediction (block 515, No), a redirect indication is generated and held. The redirect may cause an instruction fetch circuit to redirect a fetch of instructions following the branch (e.g., from the instructions following a taken branch to instructions following a not taken branch). In this particular embodiment, the redirect indication is held pending a subsequent second prediction (block 520). However, embodiments are also possible and contemplated in which the redirect occurs without waiting for the second prediction to occur.

Method 500 proceeds to block 525 either from block 515 (when the first prediction agrees with the preliminary prediction) or from block 520 after generation of the redirect. In block 525, a second degree/prediction subcircuit of the branch predictor generates a second branch prediction using a second amount of history. The second amount of history is greater than the first amount of history. The second amount of history is stored in one or more branch history tables having a total amount of storage greater than the history table(s) that store the first amount of history in the first degree of the branch prediction circuit. The second prediction is generated during a second clock cycle that occurs subsequent to the first clock cycle (e.g., the first and second clock cycles may occur consecutively).

After generating the second prediction, another check is performed to determine whether the first and second predictions are in agreement (block 530). The direction taken thereafter is dependent upon both the agreement/disagreement of the first and second predictions, as well as whether a redirect is pending based on a disagreement between the first prediction and the preliminary prediction. If the second prediction does not agree with the first prediction (block 530, no), but a redirect is pending (block 543, yes), the redirect is subsequently canceled (block 545), and the second (and final in this particular embodiment) prediction is provided to the instruction fetch circuit (block 550), which may then fetch instructions subsequent to the branch instruction in accordance with the prediction. If the second prediction does not agree with the first prediction (block 530, no) but no redirect is pending (block 543, no) due to agreement between the preliminary and first predictions, a redirect is initiated (block 547) and the second prediction is issued to the instruction fetch circuit (block 550). This particular condition occurs due to the fact that the preliminary prediction and the second prediction are in agreement, even though the first prediction is not in agreement. Since the second prediction is made using a greater amount of branch history than the first prediction, it is more likely to be correct, and thus the second prediction is used to determine which instructions to fetch following the branch instruction.

If the second prediction is in agreement with the first prediction, and redirect is pending (block 530, yes, redirect is pending), the second degree/prediction subcircuit circuit causes a redirect from the preliminary prediction (block 540). This occurs when the first and second predictions are in agreement with one another, but not in agreement with the preliminary prediction. Since both the first and second degrees of the branch prediction circuit utilize a greater amount of branch history in generating predictions relative to the base predictor, their predictions tend to be more accurate over time. In the case of block 540, the redirect that is carried out may include flushing of instructions fetched by the instruction fetch circuit based on the first prediction.

If the second prediction is in agreement with the first and no redirect is pending (block 530, Yes, no redirect is pending), then the second prediction is provided to the instruction fetch circuit and no redirect occurs (block 535). This condition occurs when the preliminary, first and second predictions are all in agreement. If instructions have been fetched based on the preliminary or first predictions, no flush of the instruction from the instruction fetch circuit is performed, since the second prediction confirms the prior two.

As noted above, Method 500 may be extended to three or more degrees. The holding of a redirect based on one prediction pending another, later prediction may be implemented at various stages in embodiments with more degrees than in this example. Furthermore, it is contemplated that the stage at which redirects are held pending subsequent predictions may be varied during operation. As a result, instruction fetches may be carried out at various times during operation of a branch prediction circuit in accordance with such an embodiment. For example, if, over time, the accuracy of predictions between a second degree and a third degree is small enough, redirects (and potentially, flushes of the instruction fetch circuit) may be carried out after a second prediction is generated. However, if operation shows that predictions made in the third degree have a significantly higher accuracy than those made in the second degree, a redirect may be delayed until after a corresponding third prediction is generated. More generally, a branch prediction circuit designed to operate in accordance with an embodiment of Method 500 having any particular number of degrees may be further designed to minimize the number of redirects and instruction flushes that may occur due to disagreement of the predictions generated by the different degrees.

Example System

Figure 6:
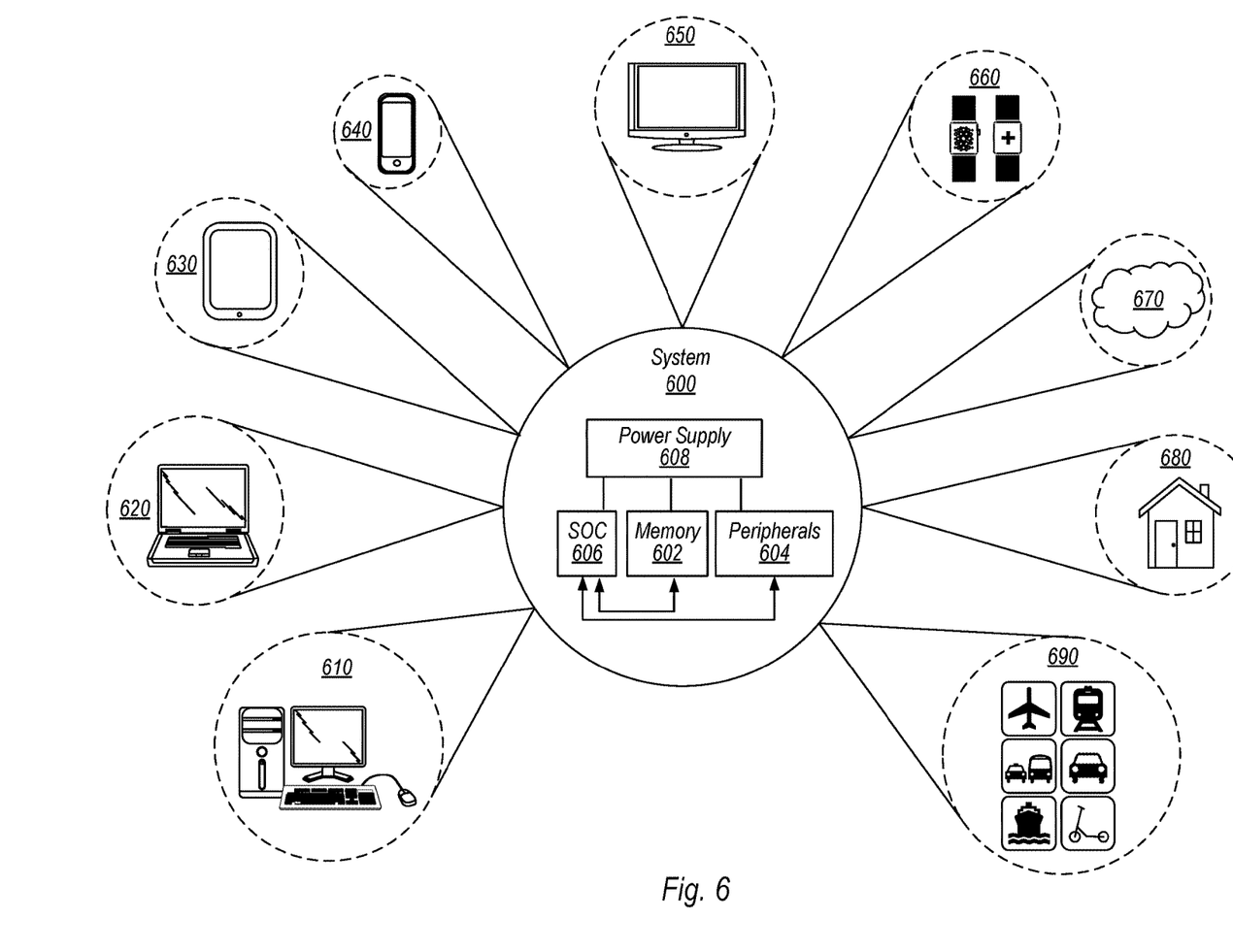
FIG. 6 is a block diagram illustrating one embodiment of an example system.

Turning next to FIG. 6, a block diagram of one embodiment of a system 600 is shown that may incorporate and/or otherwise utilize the methods and mechanisms described herein. In the illustrated embodiment, the system 600 includes at least one instance of a system on chip (SoC) 606 which may include multiple types of processing units, such as a central processing unit (CPU), a graphics processing unit (GPU), or otherwise, a communication fabric, and interfaces to memories and input/output devices. In some embodiments, one or more processors in SoC 606 includes multiple execution lanes and an instruction issue queue. In various embodiments, SoC 606 is coupled to external memory 602, peripherals 604, and power supply 608.

A power supply 608 is also provided which supplies the supply voltages to SoC 606 as well as one or more supply voltages to the memory 602 and/or the peripherals 604. In various embodiments, power supply 608 represents a battery (e.g., a rechargeable battery in a smart phone, laptop or tablet computer, or other device). In some embodiments, more than one instance of SoC 606 is included (and more than one external memory 602 is included as well).

The memory 602 is any type of memory, such as dynamic random access memory (DRAM), synchronous DRAM (SDRAM), double data rate (DDR, DDR2, DDR3, etc.) SDRAM (including mobile versions of the SDRAMs such as mDDR3, etc., and/or low power versions of the SDRAMs such as LPDDR2, etc.), RAMBUS DRAM (RDRAM), static RAM (SRAM), etc. One or more memory devices are coupled onto a circuit board to form memory modules such as single inline memory modules (SIMMs), dual inline memory modules (DIMMs), etc. Alternatively, the devices are mounted with a SoC or an integrated circuit in a chip-on-chip configuration, a package-on-package configuration, or a multi-chip module configuration.

SoC 606 in the embodiment shown may include one or more processing cores. Some of these processor cores may include one or more processing pipelines. Such processing pipelines may utilize various techniques in order to increase the processing throughput. These techniques include branch prediction to predict whether branches in such instructions will be taken or not taken, and speculative execution of instructions that follow the branch instruction, based on such predictions. Accordingly, at least some of the processors included in SoC 606 include an embodiment of the branch prediction circuit that operates in accordance with this disclosure.

The peripherals 604 include any desired circuitry, depending on the type of system 600. For example, in one embodiment, peripherals 604 includes devices for various types of wireless communication, such as Wi-Fi, Bluetooth, cellular, global positioning system, etc. In some embodiments, the peripherals 604 also include additional storage, including RAM storage, solid state storage, or disk storage. The peripherals 604 include user interface devices such as a display screen, including touch display screens or multi-touch display screens, keyboard or other input devices, microphones, speakers, etc.

As illustrated, system 600 is shown to have application in a wide range of areas. For example, system 600 may be utilized as part of the chips, circuitry, components, etc., of a desktop computer 610, laptop computer 620, tablet computer 630, cellular or mobile phone 640, or television 650 (or set-top box coupled to a television). Also illustrated is a smartwatch and health monitoring device 660. In some embodiments, smartwatch 660 may include a variety of general-purpose computing related functions. For example, smartwatch 660 may provide access to email, cellphone service, a user calendar, and so on. In various embodiments, a health monitoring device may be a dedicated medical device or otherwise include dedicated health related functionality. For example, a health monitoring device may monitor a user's vital signs, track proximity of a user to other users for the purpose of epidemiological social distancing, contact tracing, provide communication to an emergency service in the event of a health crisis, and so on. In various embodiments, the above-mentioned smartwatch may or may not include some or any health monitoring related functions. Other wearable devices are contemplated as well, such as devices worn around the neck, devices that are implantable in the human body, glasses designed to provide an augmented and/or virtual reality experience, and so on.

System 600 may further be used as part of a cloud-based service(s) 670. For example, the previously mentioned devices, and/or other devices, may access computing resources in the cloud (i.e., remotely located hardware and/or software resources). Still further, system 600 may be utilized in one or more devices of a home other than those previously mentioned. For example, appliances within the home may monitor and detect conditions that warrant attention. For example, various devices within the home (e.g., a refrigerator, a cooling system, etc.) may monitor the status of the device and provide an alert to the homeowner (or, for example, a repair facility) should a particular event be detected. Alternatively, a thermostat may monitor the temperature in the home and may automate adjustments to a heating/cooling system based on a history of responses to various conditions by the homeowner. Also illustrated in FIG. 6 is the application of system 600 to various modes of transportation. For example, system 600 may be used in the control and/or entertainment systems of aircraft, trains, buses, cars for hire, private automobiles, waterborne vessels from private boats to cruise liners, scooters (for rent or owned), and so on. In various cases, system 600 may be used to provide automated guidance (e.g., self-driving vehicles), general systems control, and otherwise. These any many other embodiments are possible and are contemplated. It is noted that the devices and applications illustrated in FIG. 6 are illustrative only and are not intended to be limiting. Other devices are possible and are contemplated.

The present disclosure includes references to "an "embodiment" or groups of "embodiments" (e.g., "some embodiments" or "various embodiments"). Embodiments are different implementations or instances of the disclosed concepts. References to "an embodiment," "one embodiment," "a particular embodiment," and the like do not necessarily refer to the same embodiment. A large number of possible embodiments are contemplated, including those specifically disclosed, as well as modifications or alternatives that fall within the spirit or scope of the disclosure.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent claims that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some tasks even if the structure is not currently being operated. Thus, an entity described or recited as being "configured to" perform some tasks refers to something physical, such as a device, circuit, a system having a processor unit and a memory storing program instructions executable to implement the task, etc. This phrase is not used herein to refer to something intangible.

In some cases, various units/circuits/components may be described herein as performing a set of tasks or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(f) during prosecution of a United States patent application based on this disclosure, it will recite claim elements using the "means for" [performing a function] construct.

Different "circuits" may be described in this disclosure. These circuits or "circuitry" constitute hardware that includes various types of circuit elements, such as combinatorial logic, clocked storage devices (e.g., flip-flops, registers, latches, etc.), finite state machines, memory (e.g., random-access memory, embedded dynamic random-access memory), programmable logic arrays, and so on. Circuitry may be custom designed, or taken from standard libraries. In various implementations, circuitry can, as appropriate, include digital components, analog components, or a combination of both. Certain types of circuits may be commonly referred to as "units" (e.g., a decode unit, an arithmetic logic unit (ALU), functional unit, memory management unit (MMU), etc.). Such units also refer to circuits or circuitry.

The disclosed circuits/units/components and other elements illustrated in the drawings and described herein thus include hardware elements such as those described in the preceding paragraph. In many instances, the internal arrangement of hardware elements within a particular circuit may be specified by describing the function of that circuit. For example, a particular "decode unit" may be described as performing the function of "processing an opcode of an instruction and routing that instruction to one or more of a plurality of functional units," which means that the decode unit is "configured to" perform this function. This specification of function is sufficient, to those skilled in the computer arts, to connote a set of possible structures for the circuit.

In various embodiments, as discussed in the preceding paragraph, circuits, units, and other elements may be defined by the functions or operations that they are configured to implement. The arrangement and such circuits/units/components with respect to each other and the manner in which they interact form a microarchitectural definition of the hardware that is ultimately manufactured in an integrated circuit or programmed into an FPGA to form a physical implementation of the microarchitectural definition. Thus, the microarchitectural definition is recognized by those of skill in the art as structure from which many physical implementations may be derived, all of which fall into the broader structure described by the microarchitectural definition. That is, a skilled artisan presented with the microarchitectural definition supplied in accordance with this disclosure may, without undue experimentation and with the application of ordinary skill, implement the structure by coding the description of the circuits/units/components in a hardware description language (HDL) such as Verilog or VHDL. The HDL description is often expressed in a fashion that may appear to be functional. But to those of skill in the art in this field, this HDL description is the manner that is used to transform the structure of a circuit, unit, or component to the next level of implementational detail. Such an HDL description may take the form of behavioral code (which is typically not synthesizable), register transfer language (RTL) code (which, in contrast to behavioral code, is typically synthesizable), or structural code (e.g., a netlist specifying logic gates and their connectivity). The HDL description may subsequently be synthesized against a library of cells designed for a given integrated circuit fabrication technology, and may be modified for timing, power, and other reasons to result in a final design database that is transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA. This decoupling between the design of a group of circuits and the subsequent low-level implementation of these circuits commonly results in the scenario in which the circuit or logic designer never specifies a particular set of structures for the low-level implementation beyond a description of what the circuit is configured to do, as this process is performed at a different stage of the circuit implementation process.

The fact that many different low-level combinations of circuit elements may be used to implement the same specification of a circuit results in a large number of equivalent structures for that circuit. As noted, these low-level circuit implementations may vary according to changes in the fabrication technology, the foundry selected to manufacture the integrated circuit, the library of cells provided for a particular project, etc. In many cases, the choices made by different design tools or methodologies to produce these different implementations may be arbitrary.

Moreover, it is common for a single implementation of a particular functional specification of a circuit to include, for a given embodiment, a large number of devices (e.g., millions of transistors). Accordingly, the sheer volume of this information makes it impractical to provide a full recitation of the low-level structure used to implement a single embodiment, let alone the vast array of equivalent possible implementations. For this reason, the present disclosure describes structure of circuits using the functional shorthand commonly employed in the industry.

Numerous variations and modifications will become apparent to those skilled in the art once the above disclosure is fully appreciated. It is intended that the following claims be interpreted to embrace all such variations and modifications.

What is claimed is:

1. An apparatus, comprising:
   an instruction fetch circuit configured to fetch instructions, including branch instructions, for execution; and
   a branch prediction circuit that includes a plurality of prediction subcircuits, including:
   a base prediction circuit of the plurality of prediction subcircuits configured to generate a preliminary prediction;
   a first prediction subcircuit configured to:
      store a first amount of branch history data; and
      based on an indication of a given branch instruction, output, in a particular clock cycle, a first prediction for the given branch instruction using the first amount of branch history data;
   a second prediction subcircuit configured to:
      store a second amount of branch history data with respect to the first prediction subcircuit; and
      based on the indication of the given branch instruction, output, in a different clock cycle, a second prediction for the given branch instruction using the second amount of branch history data; and
   a control circuit configured to:
      cause, based on a comparison of the preliminary and first predictions, an instruction fetch based on the first prediction to be delayed by the instruction fetch circuit; and
      override, in subsequent clock cycles, the instruction fetch based on the first prediction based on a contrary prediction performed by the second prediction subcircuit.

2. The apparatus of claim 1, wherein the first prediction subcircuit is further configured to generate the first prediction using the first amount of branch history data from a first history table, and wherein the second prediction subcircuit is further configured to generate the second prediction using the second amount of branch history data from two or more additional history tables, wherein the two or more additional history tables are configured to store more history than the first history table.

3. The apparatus of claim 2, wherein the plurality of prediction subcircuits includes a third prediction subcircuit configured to generate a third prediction during a third clock cycle that is subsequent to the different clock cycle, wherein the third prediction subcircuit includes at least two history tables configured to store more branch history data than the two or more additional history tables of the second prediction subcircuit.

4. The apparatus of claim 1, wherein the base prediction circuit comprises a saturating counter.

5. The apparatus of claim 1, wherein the instruction fetch circuit is configured to carry out a first instruction fetch in accordance with the preliminary prediction, and wherein the first prediction subcircuit is configured to cause the instruction fetch circuit to redirect the first instruction fetch if the first prediction does not agree with the preliminary prediction.

6. The apparatus of claim 1, wherein to delay the instruction fetch circuit based on the first prediction the control circuit is further configured to delay the instruction fetch until the second prediction subcircuit has generated the second prediction, and wherein the branch prediction circuit is further configured to perform the instruction fetch with the preliminary prediction based on a determination that the second prediction agrees with the preliminary prediction, wherein the preliminary prediction is performed prior to the first prediction.

7. The apparatus of claim 1, wherein the instruction fetch circuit is configured to flush results of a fetch made in accordance with a prediction by one of the plurality of prediction subcircuits in response to another one of the prediction subcircuits overriding the prediction of the one of the plurality of prediction subcircuits.

8. The apparatus of claim 1, wherein the plurality of prediction subcircuits are configured to concurrently receive the indication of the given branch instruction.

9. The apparatus of claim 1, further comprising a training circuit coupled to the branch prediction circuit configured to train the plurality of prediction subcircuits using a common branch prediction scheme and known correct execution results of branch instructions.

10. A method comprising:
    fetching instructions using an instruction fetch circuit, the instructions including branch instructions;
    generating branch predictions by a plurality of prediction subcircuits of a branch prediction circuit, using a common branch prediction scheme, wherein generating the branch predictions includes:
       storing different amounts of branch history in different ones of the plurality of prediction subcircuits with respect to other ones of the prediction subcircuits;
       receiving, during a particular clock cycle, an indication of a given branch instruction concurrently by the different ones of the plurality of prediction subcircuits;
       generating, by a base prediction subcircuit of the plurality of prediction subcircuits, a preliminary prediction;
       generating, by a first prediction subcircuit of the plurality of prediction subcircuits in a first clock cycle, a first prediction for the given branch instruction using a first amount of branch history data;
       based on a comparison of the preliminary and first predictions, delaying, by the instruction fetch circuit, an instruction fetch based on the first prediction;
       generating, by a second prediction subcircuit of the plurality of prediction subcircuits, a second prediction for the given branch instruction using a second amount of branch history data; and
       overriding the first prediction generated by the first prediction subcircuit in the first clock cycle with the second prediction generated by the second prediction subcircuit during a second clock cycle that is subsequent to the first clock cycle.

11. The method of claim 10, further comprising:
generating the preliminary prediction using a saturating counter.

12. The method of claim 10, further comprising:
fetching, using the instruction fetch circuit, a first instruction in accordance with the preliminary prediction; and
redirecting the fetching of the first instruction, using the first prediction subcircuit, in response to determining that the first prediction does not agree with the preliminary prediction.

13. The method of claim 10, wherein the delaying of the instruction fetch based on the first prediction includes:
delaying fetching a first instruction using the first prediction until the second prediction subcircuit has generated the second prediction subsequent to the generating of the first prediction.

14. The method of claim 10, wherein the overriding of the first prediction includes:
canceling fetching of a first instruction using the first prediction in response to the second prediction being in agreement with the preliminary prediction.

15. The method of claim 10, further comprising:
flushing results of a fetch made in accordance with a prediction by one of the plurality of prediction subcircuits in response to another one of the plurality of prediction subcircuits overriding the prediction of the one of the plurality of prediction subcircuits.

16. The method of claim 10, further comprising storing the first amount of branch history data in a first history table of the first prediction subcircuit, and storing the second amount of branch history data in two or more branch history tables of the second prediction subcircuit, wherein the second amount is greater than the first amount.

17. A system comprising:
a processing circuit including:
an instruction fetch circuit configured to fetch instructions, including branch instructions, for execution in the processing circuit; and
a branch prediction circuit configured to generate predictions of a direction to be taken by ones of the branch instructions, wherein the branch prediction circuit includes:
a base prediction circuit configured to generate a preliminary branch prediction for a particular branch instruction;
a first branch prediction subcircuit configured to generate a first branch prediction, during a first clock cycle, based on a first amount of branch history stored in a first history table; and
a second branch prediction subcircuit configured to generate a second branch prediction, during a second clock cycle subsequent to the first clock cycle, based on a second amount of branch history stored in at least two additional branch history tables, wherein the second amount of branch history is greater than the first amount of branch history;
wherein the branch prediction circuit is configured to delay an instruction fetch based on the first branch prediction if the first branch prediction does not agree with the preliminary branch prediction; and
wherein the second branch prediction subcircuit is configured to override the instruction fetch based on the first branch prediction if the second branch prediction does not agree with the first branch prediction.

18. The system of claim 17, wherein the first branch prediction subcircuit is configured to, based on the delay of the instruction fetch, cause the instruction fetch circuit to redirect the instruction fetch, and wherein to override the instruction fetch, the second branch prediction subcircuit is further configured to cause the instruction fetch circuit to redirect the instruction fetch if the second branch prediction does not agree with the first branch prediction and the preliminary branch prediction.

19. The system of claim 18, wherein to override the instruction fetch, the second branch prediction subcircuit is further configured to cancel redirecting of the instruction fetch in response to the second branch prediction being in agreement with the preliminary branch prediction concurrent with the first branch prediction not being in agreement with the preliminary branch prediction.

20. The system of claim 17, wherein the base prediction circuit, the first branch prediction subcircuit, and the second branch prediction subcircuit are configured to concurrently receive an indication of the particular branch instruction.

* * * * *